Jan. 3, 1967  E. S. MURPHY  3,295,647
MULTIPLE DISC SPOT CLUTCH WITH BOOSTER
Filed Nov. 23, 1964  2 Sheets-Sheet 1

Inventor
Eugene S. Murphy
By Joseph W. Malleck
Att'y.

Inventor
Eugene S. Murphy
By Joseph W. Malleck
Att'y

United States Patent Office 3,295,647
Patented Jan. 3, 1967

3,295,647
MULTIPLE DISC SPOT CLUTCH WITH BOOSTER
Eugene S. Murphy, Rockford, Ill., assignor to Borg-Warner Corporation, Chicago, Ill., a corporation of Illinois
Filed Nov. 23, 1964, Ser. No. 413,182
6 Claims. (Cl. 192—85)

This invention relates to friction devices and more particularly to hydraulically actuated clutches and/or brakes of the type which are capable of high energy absorption by efficient cooling.

The primary object of this invention is to provide a high capacity friction device of improved construction characterized by simplicity and compactness.

Another object is to provide a high energy or high capacity friction device which is more durable and is capable of efficiently dissipating the generated heat of such high energy application.

Another object is to provide a high energy type friction device of the type having a multiple number of friction discs and employing unique structure for maintaining proper clearances between said discs during all operative phases of the device.

Other objects and advantages of this invention will become apparent from the following detailed description taken in connection with the accompanying drawings in which.

Turning now to the drawings, the friction device 10 and system 11, in its broad aspects, comprises rotative input means A, rotative output means B effective to carry a plurality of driven discs C, said rotative input means also including a caliper means D. A housing E is arranged to surround said clutch and is effective to act as a reservoir in collecting oil from the clutch. A hydraulic actuator F, is formed as a part of the caliper structure and employs a stepped piston and cylinder arrangement. Chambers H are provided surrounding the driven discs and disposed between portions of said actuator effective to contain cooling medium for dissipating the generated heat of operation. The hydraulic system providing fluid for said cooling medium and actuation of said actuator comprises a sump I to which is connected a pump P of conventional construction for drawing fluid from the sump and supplying said fluid to the actuator F by way of a fluid system S; a fluid cooler T is interposed in said fluid system S and a pressure relief valve R is employed to divert the pump pressure for use as a cooling medium at a reduced pressure.

Figure 1:
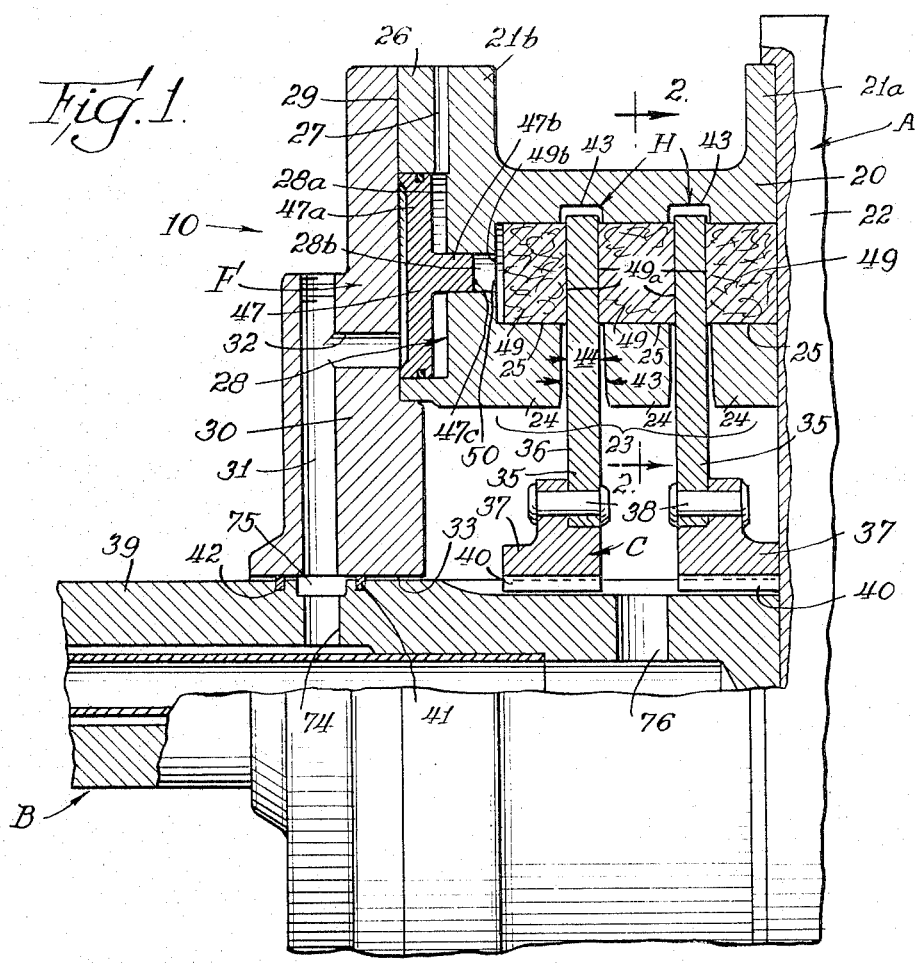
FIGURE 1 is a fragmentary central sectional view of a friction device embodying the principles of this invention and having portions thereof broken away.
Figure 2:
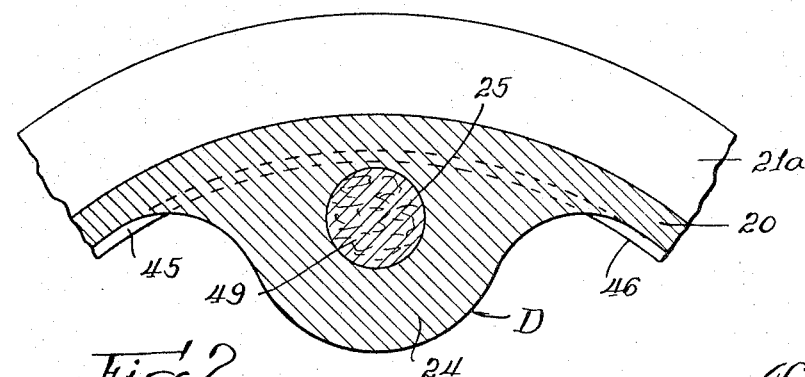
FIGURE 2 is a fragmentary sectional view taken substantially along line 2—2 of FIGURE 1.
Figure 3:
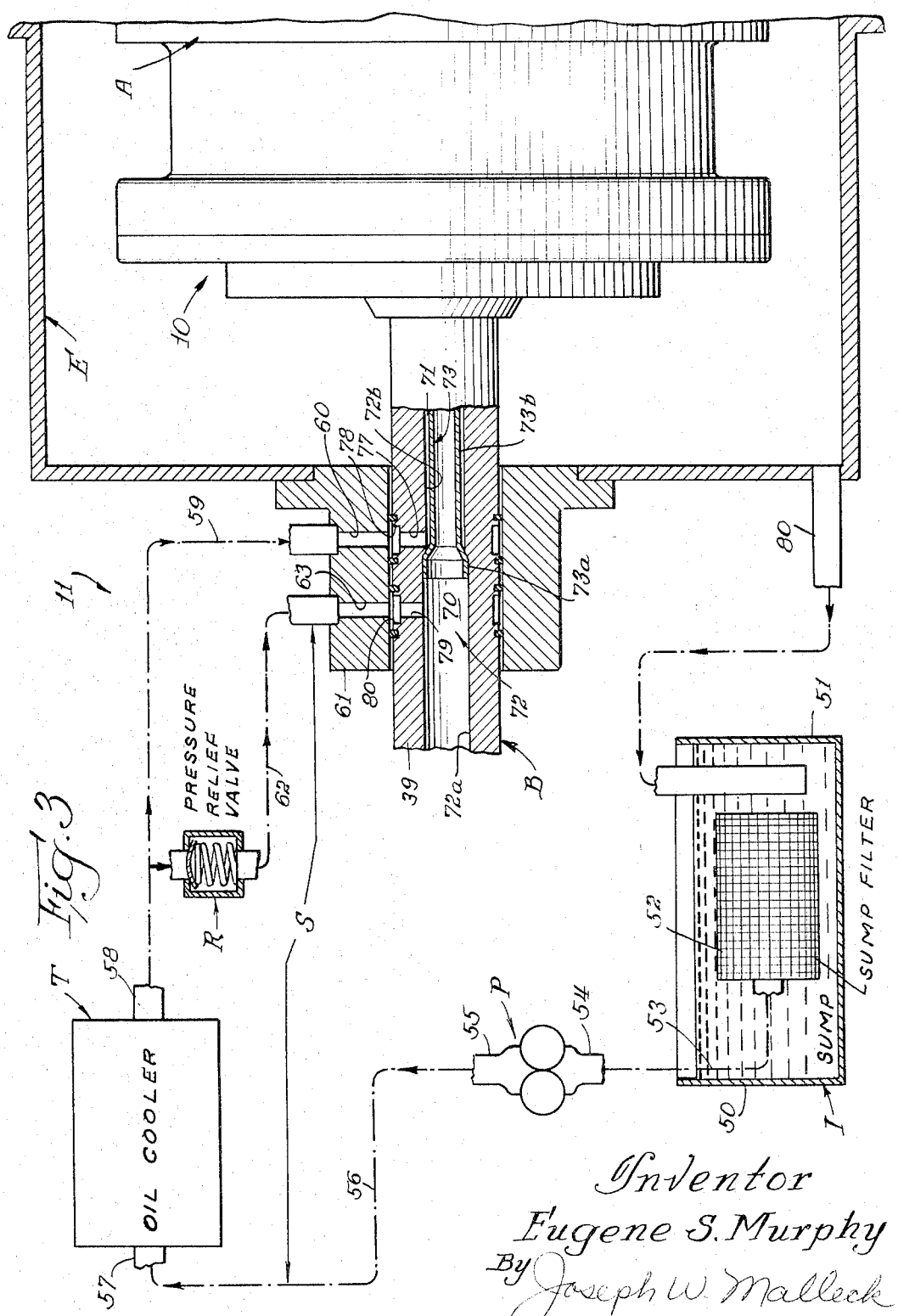
FIGURE 3 is a schematic illustration of the hydraulic controls employed to operate the friction device of FIGURE 1 and having certain portions of said controls shown in central sectional view.

Turning now more particularly to the structure of said components, and first to FIGURE 1, the friction device 10 employs the input means A including a circular cylindrical drum 20 having annular flanges 21a and 21b at opposite ends thereof, flange 21a being effective for mounting said drum to a driving wheel 22; the drum has a series 23 of radially inwardly depending walls 24, each series being disposed at diametrically opposite positions of said drum. Each wall 24 of each series has a cylindrical bore 25 provided therein, said bores being coaxially aligned. Extending inwardly from the exterior surface 26 of flange 21b is a passage 27 communicating with a stepped cylinder or bore 28 coaxially aligned with bores 25; there is a passage 27 and stepped cylinder at diametrically opposite side of the drum. Each stepped cylinder has enlarged circular cylindrical portion 28a and a reduced circular cylindrical portion 28b. The passage 27 is effective to carry leakage oil to the outer surface of the device 10 where it may return to the bottom of the housing E by gravity. The smaller portion 28b of the stepped bore has a diameter which is less than the diameter of said coaxial bores 25; the larger portion 28a is of a diameter greater than the diameter of the bores 25.

The input means also includes an end plate 30 secured to the end 29 of the drum 20 by suitable fasteners (not shown) and employs a radially extending conduit 31 and an axially extending conduit 32 effective to communicate fluid passages within the output means B with the enlarged portion 28a of the stepped cylinder 28. The end plate has a central opening 33 provided therein for receiving the output means B.

The output means B comprises firstly a plurality of friction driven discs 35 each including an annular plate 36 and a forged hub 37, the plate and hub being fastened together at 38. Each hub 37 is splined at 40 to an output shaft 39 which extends through the opening 33 of the end plate. Suitable sealing rings 41 are disposed in annular grooves 42 for sealing between the walls of the opening 33 and the exterior of the shaft 39. The thickness 44 of each plate 36 is smaller than the spacing 43 between the depending walls 24; this defines in part a chamber which envelops each of the plates; a shallow groove 45 is provided in the interior wall 46 of the drum 20 to complete said chambers.

The actuator F comprises a stepped piston 47 having portions 47a and 47b effective to respectively slide within the portions 28a and 28b of the stepped cylinder 28. A plurality of friction buttons 49 each are slideably disposed in the one of the bores 25 formed in the depending walls 24 of the drum 20. Each of the friction buttons 49 may be comprised of friction material as a cotton or asbestos flock and each have a circular face 49a effective to engage with a disc 35 at a particular peripheral position. A wax medium 50 is disposed between the end 47c of the smaller portion of the stepped piston 47 and outward face 49b of the adjacent button for transmitting force therebetween. This material is normally in solid state except when under pressure to then become slightly plastic or fluid.

Turning now to the fluid system S, the sump I has a container 51 from which fluid may be drawn through a filter 52 to screen out the impurities. Conduit 53 communicates the sump fluid with the inlet 54 of pump P; the latter may be of a conventional rotary gear type construction. The outlet 55 of the pump P communicates by way of a conduit 56 with the inlet 57 of the oil cooler T (the oil cooler may also be of conventinal cnstruction). The outlet 58 of the oil cooler communicates directly by way of conduit 59 with a radial passage 60 formed in a block 61 mounted about shaft 39. Another conduit 62 communicates a reduced pressure to another radial passage 63 in said block 61. A pressure relief valve R is interposed in conduit 62 to regulate a supply of reduced pressure for cooling purposes as transmitted to chambers H.

Passages 70 and 71 are provided internally within shaft 39 for communicating radial passages 60 and 63 with radial passage 39 and the chambers H respectively. To define passages 70 and 71, a central stepped bore 72 is provided in shaft 39 having an enlarged portion 72a, a reduced portion 72b and a further reduced portion 72c at the terminating end thereof. A tube 73 is disposed within the stepped bore 72 and has a head 73a disposed tightly against the transition between the enlarged portion 72a and the reduced portion 72b of stepped bore 72.

The shank 73b of the tube extends through the reduced portion 72b and into the reduced portion 72c where it fits tightly. A radial conduit 74 communicates between the tube 73 and the stepped portion 73b with an annular groove 75 which in turn is in communication with the inlet passageway to the hydraulic actuator F of the clutch. A radial conduit 76 communicates the interior of tube 73 with the chambers H surrounding the friction means C. At the other end of the shaft 39 a radial conduit 77 communicates the space between the stepped portion 73b and the shank of tube 73 with an annular groove forming the outer periphery of the shaft and which is in turn in communication with the inlet conduit 60. Radial passage 79 communicates the interior of the tube 73 with an annular groove 80 which in turn is in communication with the inlet conduit 63.

While I have described my invention in connection with one specific embodiment, it is to be understood that this is by way of illustration and not by way of limitation and the scope of my invention is defined solely by the appended claims which should be construed as broadly as the prior art will permit.

I claim:

1. A high energy friction device comprising: rotative input means and rotative output means, one of said means carrying an annular housing having at least one series of three or more coaxial and spaced cylindrical chambers, the other of said means carrying a plurality of friction discs having sides with one disc each interposed between adjacent chambers; a plurality of friction buttons, with one each slideably disposed in one of said chambers effective to be urged against a side of said discs for promoting rotative drive therebetween; hydraulic actuating means comprising a stepped piston and cylinder assembly effective to exert a multiplied force against one of the outermost buttons of said series; and a cooling system effective to circulate a cooling medium about the sides of said discs.

2. A friction device as in claim 1, in which said device comprises a hydraulic control mechanism effective to supply a predetermined high pressure source to said stepped piston and cylinder means selectively, and a lower pressure to said cooling medium.

3. A friction device as in claim 1, in which said friction buttons are provided with at least two series of diametrically opposite buttons, each series having three or more buttons and effective to engage opposite portions of each of said discs.

4. A friction device as in claim 1, in which a wax base material is disposed between said stepped piston and cylinder and the outermost of said buttons for transmitting force therebetween.

5. A friction device comprising rotative inputs and output means, said rotative input means carrying an annular housing having a plurality of not less than three depending walls with coaxially aligned chambers with one each defined in each of said walls, said housing also carrying a stepped bore having the smaller portion of said bore communicating with one of said wall chambers, a stepped piston slideable in said stepped bore, a plurality of driven discs having one each disposed between each of said chambers, and means slideable in said wall chambers for transferring the force of said piston between said discs.

6. A frictional device comprising a plurality of rotatable friction discs; a casing surrounding said discs in spaced relation thereto and having at least one stepped bore therein; actuator means comprising a stepped piston slideable in said stepped bore and defining with said bore a fluid receiving chamber; a plurality of buttons movable in said casing in response to force received from said piston for frictionally gripping said discs to provide conjoint rotation of said casing and discs, said piston being effective to apply a high ratio force to said buttons upon introduction of pressurized fluid to said receiving chamber, said buttons being arranged in said casing in generally concentric alignment and having a button surface adjacent each and every disc side, conduit means communicating said buttons and the end of said stepped piston having a wax medium disposed in said conduit for transferring force between said piston and buttons.

References Cited by the Examiner

UNITED STATES PATENTS

| 2,538,997 | 1/1951 | Weiland | 192—85 |
| 2,755,903 | 7/1956 | McAninch et al. | 192—113.2 |
| 2,862,589 | 12/1958 | Porteous et al. | 192—85.2 X |
| 3,132,724 | 5/1964 | Ansteth | 188—73 |

FOREIGN PATENTS 738,114  10/1955  Great Britain.

DAVID J. WILLIAMOWSKY, *Primary Examiner.*

BENJAMIN W. WYCHE, III, *Examiner.*